(12) United States Patent
Rudroff (10) Patent No.: US 8,505,355 B2
(45) Date of Patent: Aug. 13, 2013

(54) METHOD AND APPARATUS FOR A BIDIRECTIONAL METER PROVING SYSTEM

(75) Inventor: Daniel J. Rudroff, Houston, TX (US)

(73) Assignee: Welker Flow Measurement Systems, Inc., Sugar Land, TX (US)

( * ) Notice: Subject to any disclaimer, the term of this patent is extended or adjusted under 35 U.S.C. 154(b) by 1025 days.

(21) Appl. No.: 12/128,932

(22) Filed: May 29, 2008

(65) Prior Publication Data

US 2009/0293582 A1 Dec. 3, 2009

(51) Int. Cl.
*G01F 25/00* (2006.01)

(52) U.S. Cl.
USPC .......................................................... 73/1.23

(58) Field of Classification Search
USPC .................... 73/1.18, 1.19, 1.22, 1.23
See application file for complete search history.

(56) References Cited

U.S. PATENT DOCUMENTS

| | | |
|---|---|---|
| 3,021,703 A | 2/1962 | Pfrehm |
| 3,120,118 A | 2/1964 | Boyle |
| 3,224,247 A | 12/1965 | Barrett, Jr. |
| 3,273,375 A | 9/1966 | Howe |
| 3,288,163 A | 11/1966 | Craven |
| 3,387,483 A | 6/1968 | Arsdale |
| 3,421,360 A | 1/1969 | Luse et al. |
| 3,423,988 A | 1/1969 | Grove et al. |
| 3,457,768 A | 7/1969 | Jasek |
| 3,472,280 A | 10/1969 | Scoy |
| 3,504,523 A | 4/1970 | Layhe |
| 3,530,705 A | 9/1970 | Lathrop |
| 3,580,045 A | 5/1971 | Pfrehm |
| 3,638,475 A | 2/1972 | Grove et al. |
| 3,668,923 A | 6/1972 | Grove et al. |
| 3,738,153 A | 6/1973 | Simmons |
| 3,777,545 A | 12/1973 | Griffin et al. |
| 3,798,957 A | 3/1974 | Moroney et al. |
| 3,800,587 A | 4/1974 | Clinton |
| 3,817,268 A | 6/1974 | Kirkwood |
| 3,830,092 A | 8/1974 | Dunegan et al. |
| 3,848,621 A | 11/1974 | Dickenson |
| 3,911,724 A | 10/1975 | Grove et al. |
| 3,943,749 A | 3/1976 | Van Scoy |
| 3,955,399 A | 5/1976 | Neal |
| 3,958,444 A | 5/1976 | Baker |
| 3,978,707 A | 9/1976 | Grove et al. |
| 3,978,708 A | 9/1976 | Hayward |
| 3,998,089 A | 12/1976 | Grove et al. |
| 4,012,939 A | 3/1977 | Hayward |
| 4,106,328 A * | 8/1978 | Neeff .............................. 73/1.18 |
| 4,128,002 A | 12/1978 | Cameron et al. |
| 4,134,288 A | 1/1979 | Kim |
| 4,237,921 A | 12/1980 | Hayward |

(Continued)

OTHER PUBLICATIONS

Hayward, Alan T.J., Pipe Provers, A User's Manual, Cambridge University Press, 1991.

(Continued)

*Primary Examiner* — Robert R Raevis
(74) *Attorney, Agent, or Firm* — Husch Blackwell LLP (57) ABSTRACT

A bidirectional sphere prover is used to check the accuracy of a custody transfer meter when fluids, such as crude oil or gasoline are bought and sold. The bidirectional sphere prover of the present invention uses a straight calibrated section of pipe between the detection switches, the straight calibrated section of pipe being free of welds, flanges and elbows.

9 Claims, 4 Drawing Sheets

(56) References Cited

U.S. PATENT DOCUMENTS

| | | | |
|---|---|---|---|
| 4,481,805 A | 11/1984 | Dobesh | |
| 4,481,806 A | 11/1984 | Schad | |
| 4,566,307 A * | 1/1986 | Boykin | 73/1.28 |
| RE32,157 E | 5/1986 | Waugh et al. | |
| 4,606,218 A | 8/1986 | Chisman | |
| 4,829,808 A | 5/1989 | West | |
| 4,947,675 A | 8/1990 | Webb | |
| 5,317,895 A | 6/1994 | Ogawa et al. | |
| 5,392,632 A | 2/1995 | Umeda et al. | |
| 6,792,361 B2 | 9/2004 | Vun Cannon | |
| 2006/0141242 A1 * | 6/2006 | Keener | 428/334 |
| 2007/0119227 A1 * | 5/2007 | Moriyama | 73/1.16 |
| 2008/0083262 A1 * | 4/2008 | Augenstein et al. | 73/1.16 |

OTHER PUBLICATIONS

Rudroff, Daniel J., L.A.C.T. Units Metering Systems & Proving Systems, Welker Flow Measurement Systems, Inc., Rev. 4, Dec. 28, 2005, Sugar Land, Texas.

American Petroleum Institute, Manual of Petroleum Measurement Standards, Chapter 4—Proving Systems, Third Edition, Sep. 2003.

American Petroleum Institute, Manual of Petroleum Measurement Standards, Chapter 4—Proving Systems, Section 8—Operation of Proving Systems, First Edition Nov. 1995, Reaffirmed Mar. 2002.

* cited by examiner

METHOD AND APPARATUS FOR A BIDIRECTIONAL METER PROVING SYSTEM

DESCRIPTION OF THE PRIOR ART

When crude oil is being offloaded from a tanker, a custody transfer typically takes place and ownership of the crude oil changes hands. Likewise, money changes hands and an accurate volumetric measurement of the crude oil is required. A lease automatic custody transfer unit (L.A.C.T.) also known as a Petroleum Metering System is typically used to measure the crude oil or other flinds. Those skilled in the art know that a L.A.C.T. unit typically includes a sampler, a strainer, a custody transfer meter, a 3-way valve and manifold, a meter prover, a back pressure valve, an electronic flow computer and other components. The present invention is a bidirectional sphere meter proving system with a straight calibrated section. This meter proving system with a straight calibrated section is one component in the L.A.C.T. unit. Attached to the Information Disclosure Statement is an article by Dan J. Rudroff entitled "L.A.C.T. Units Metering Systems & Proving Systems" which is incorporated herein by reference.

An early meter proving system, and perhaps the first, was developed by Shell in Texas and is described in the book, *Pipe Provers, A User's Manual* by Alan T. J. Hayward on page 2. According to this book, the idea was to determine the volume of about a one-mile length of pipe, and then to track the movement of a piston along this length, while noting the meter readings as the piston first entered and finally left the measured length of pipe. This development was also described in an article by M. A. Levy in The Oil and Gas Journal, entitled "Here's the Way to Proper Meter Calibration," Jun. 30, 1958. This early meter proving system was described as 'the measured mile' and 'the miracle mile'. This early meter proving system was inconvenient to use because, at the end of a run, the piston had to be removed from the pipe, transported back to its starting point by vehicle, and then re-inserted into the pipe. It also failed to give the accuracy required for modern custody transfer purposes, because the temperature was liable to vary along a mile of pipe to such an extent that thermal expansion of the oil introduced unacceptable errors. Further, there were flanges and welds in the pipe which introduced other errors.

Things have improved a lot since the "measured mile." Modem meter proving systems and custody transfer meters are much more accurate than these early efforts almost 50 years ago. Currently, modern custody transfer meters are divided into four categories as follows: positive displacement (PD) meters; turbine meters; coriolis meters and ultra sonic meters. PD and turbine meters combined make up more than 80% of the custody transfer meters currently in use in the U.S. for crude oil. Coriolis and ultra sonic meters generate "manufactured pulses." PD and turbine meters generate "actual pulses." Both the manufactured pulses and the actual pulses are counted by an electronic flow computer to calculate the volume of oil that is being offloaded.

Even modern custody transfer meters may sometimes get out of calibration which can make a big dollar difference when a tanker is being offloaded. Today, L.A.C.T. units always include a prover to make sure that the custody transfer meters are accurate throughout the metering process. It is common to make five or more prover "runs" during the offloading process. The custody transfer meter runs continuously during the offloading of the ship; however, the prover only runs periodically to check the accuracy of the custody transfer meter. If it takes the ship about 36 hours to offload, for example, each prover run may only take about 30 minutes, for example. Those skilled in the art know that L.A.C.T. units and provers are also used in other situations when a custody transfer occurs, for example when oil is taken from or added to a pipeline.

When the meter proving system is being run, the entire fluid flow from the custody transfer meter is diverted through the prover. Some electronic flow computers accumulate 10,000 pulses from the custody transfer meter during one pass through the prover. If fewer than 10,000 pulses are emitted from the custody transfer meter during the prover run, or if the pulses are unevenly spaced, the signals must be interpolated or more pulses taken. Interpolation is done by the electronic flow computer.

Crude oil meter proving systems in the U.S. are currently controlled by The American Petroleum Institute Manual of Petroleum Measurement Standards, Chapter 4—Proving Systems, Section 2, Displacement Provers, Third Edition, September 2003 (hereinafter sometimes referred to as, API Standard, Chapter 4, Section 2). This API Standard, a copy of which are included in the Information Disclosure Statement, have approved four types of meter proving systems as follows: a) unidirectional piston provers, see page 8; b) bidirectional piston provers, see page 9; c) unidirectional sphere provers, see page 6 and d) bidirectional sphere provers, see page 9. As previously noted, the present invention is a bidirectional sphere meter proving system.

A. Unidirectional Piston Provers

Historically, unidirectional piston provers have been referred to as "small volume provers." These provers typically accumulate less than 10,000 unaltered pulses from the custody transfer meter during one pass of the piston displacer and therefore require pulse interpolation. Since the small volume of these provers may not allow for the accumulation of 10,000, unaltered pulses, the electronic flow computer must provide means for pulse interpolation. The only practice currently recognized by the API for pulse interpolation is double chronometry. In the crude oil business in the U.S., these unidirectional piston provers represent about 3 to 5% of the provers currently in operation for custody transfer purposes. The following patents refer to unidirectional piston provers: U.S. Pat. Nos. 3,955,399; 4,481,805; 4,829,808 and 5,317,895.

B. Bidirectional Piston Provers

Bidirectional piston provers have a straight length of pipe through which the piston travels back and forth, actuating a detector at each end of the calibrated section. Suitable supplementary piping and a 4-way reversing valve or valve assembly that is either manually or automatically operated make possible the reversal of the flow through the prover. In the U.S., these bidirectional piston provers represent about 2 to 10% of the provers currently in operation for crude oil custody transfer purposes. The following patents refer to bidirectional piston provers: U.S. Pat. Nos. 3,021,703; 3,120,118; 3,273,375; 3,457,768; 4,606,218; 5,392,632; and Reissue 32,157.

C. Unidirectional Sphere Provers

Typical unidirectional prover piping is arranged so that the sphere is returned to a start position using a sphere handling interchange. A sphere is described in U.S. Pat. No. 7,086,113. These provers typically use electromechanical detector switches. The design of the prover usually allows the accumulation of 10,000 meter pulses for a proving pass. However, designs that accumulate less than 10,000 meter pulses may be used for meter proving provided pulse interpolation is used and additional criteria defined in paragraph 4.3.2.2 of the API Standard is followed. In the U.S., these unidirectional sphere provers represent about 10 to 15% of the provers currently in operation for crude oil custody transfer purposes.

The following patents reference unidirectional sphere provers: U.S. Pat. Nos. 3,224,247; 3,387,483; 3,504,523; 3,638,475; 3,738,153; 3,777,545; 3,800,587; 3,817,268; 3,830,092; 3,848,621; 3,911,724; 3,943,749; 3,998,089; 4,128,002; 4,134,288 and 4,947,675.

D. Bidirectional Sphere Provers

The present invention is a bidirectional sphere prover. Prior art bidirectional sphere provers typically have a calibrated U-shaped length of pipe or a calibrated serpentine section of pipe through which the sphere travels back and forth, actuating a detector switch near each end of the pipe. Suitable supplementary piping and a reversing valve or valve assembly that is either manually or automatically operated make possible the reversal of the flow through the prover. These provers typically use mechanical detector switches. A prior art bidirectional U-shaped sphere prover is shown on page 10 of the API Standard. In the U.S., these bidirectional sphere provers represent about 70 to about 80% of the provers currently in operation for crude oil custody transfer purposes.

There are several differences between prior art bidirectional piston provers and prior art bidirectional sphere provers. The prior art bidirectional piston proves typically use a machined piston that passes through a honed or machined cylinder. The inside of the calibrated piping in a bidirectional sphere prover is not machined or honed and is typically coated with a corrosion inhibitor such as epoxy. Many prior art bidirectional piston provers use proximity detector switches which do not penetrate the pipe wall to detect the passage of the piston. Many bidirectional sphere provers use mechanical detector switches which actually penetrate the pipe wall to detect passage of the sphere. The proximity detector switch will not detect passage of a typical sphere. Bidirectional piston provers do not have launch chambers like bidirectional sphere provers. Because of these many structural differences, the piston and the sphere are not interchangeable between these two types of prior art provers.

The API Standard on page 9, paragraph 3.12.1 states as follows: "The main body of the prover (bidirectional sphere prover) is often a straight piece of pipe but it may be contoured or folded to fit in a limited space or to make it more mobile." Notwithstanding the comments in the API Standard, Applicant's are aware of only one straight run bidirectional sphere prover which is located in Calcasieu Parish, La. at the Targa plant. A photograph of this bidirectional sphere prover at the Targa plant is included in the Information Disclosure Statement. The Targa prover has a flange in the middle of the calibrated section of pipe between the two detection switches. The pipe diameter on the Targa prover is about 16 to 20 inches, the distance between the two detector switches is about 50 feet and the total length of the straight pipe run is about 70 to about 80 feet long.

The present invention is a bidirectional spherical prover that uses a straight run of calibrated pipe between the two detection switches. Unlike the prior art, there are no flanges, welds or elbows between the detection switches of the present invention. The present invention has numerous advantages over conventional bidirectional spherical provers, which use a U-shaped calibrated section of pipe or a serpentine calibrated section of pipe which includes several elbows and flanges. These calibrated elbows and machined flanges used in prior art provers are expensive. The following patents refer to bidirectional sphere provers: U.S. Pat. Nos. 3,423,988; 3,530,705; 3,472,280 and 3,798,957. The following patents refer to bidirectional plug type provers: U.S. Pat. Nos. 3,421,360; 3,580,045 and 3,668,923. The following patents refer to provers and related equipment: U.S. Pat. Nos. 3,288,163; 3,958,444; 3,978,708; 3,978,707; 4,012,939; 4,237,921; 4,481,806 and 6,792,361. There is still a need for improved bidirectional sphere provers.

SUMMARY OF THE INVENTION

The present invention is a bidirectional sphere prover that uses a straight run of calibrated pipe between the two detection switches. This portion of pipe is also sometimes referred to as the straight calibrated section of pipe between the two detection switches. This portion of pipe is referred to as "calibrated" because the volume of the straight section between the detector switches has been verified by a third party using a technique which is referred to as a "water draw" in the industry.

To conduct the initial calibration session for a newly manufactured prover using the water draw technique, a third party drives a truck to the manufacturing plant for the bidirectional sphere prover. The Seraphin® tanks on the truck are calibrated and certified. The seraphin tanks are filled with water and so is the prover. The Seraphin tanks on the truck are connected to the prover with hose. Air is purged from the entire system.

Water is pumped into the prover forcing the sphere to travel between the detectors. When the sphere activates the first switch the water is diverted into Seraphin tanks whose precise volume is directly traceable to NIST the National Institute of Standards and Technology. When the second detector switch the water flow is diverted to the pump holding tank. The amount of water in the Seraphin tanks is then determined. The Seraphin tanks are then emptied and the ball is then sent in the opposite direction and the procedure repeated. The combined volume from the forward and reverse runs is combined as one pass. Two more passes are made each of which has to be within 0.02% of the other. These three trips are averaged and this becomes the prover calibrated volume between the detector switches. For this reason, the straight section of pipe in the present invention between the two detection switches is referred to as "calibrated".

The straight run of calibrated pipe in the present invention is free of flanges, welds, elbows and other impediments used in the prior art. The bidirectional sphere prover may be used to prove meters that measure liquids, such as crude oil and gasoline. The invention has numerous advantages over the prior art. First it is more accurate. The present invention will allow the custody transfer meter to produce about 10,000 pulses which are substantially evenly spaced between each other. The present invention will allow the sphere to move at a substantially constant velocity between the detector switches. Second, the invention has reduced pressure drop which makes it less expensive to operate. (Pressure drop is a negative feature in liquid transportation systems which increases operating costs.) Third, the invention is cheaper to produce because there is no need for raised face weld neck forged steel flanges which are commonly referred to as machined flanges or superior quality elbows which are expensive. When coriolis and ultra sonic meters are being used, the calibrated straight section of pipe is shorter than prior art bidirectional sphere provers. Fourth, the invention can be inspected in the field without recalibrating using a water draw, which is a substantial operational saving. Fifth, there is no modification to the integrity of the components, unlike the prior art, because the invention may be produced from standard unaltered flanges and elbows.

DETAILED DESCRIPTION OF THE INVENTION

Figure 1:
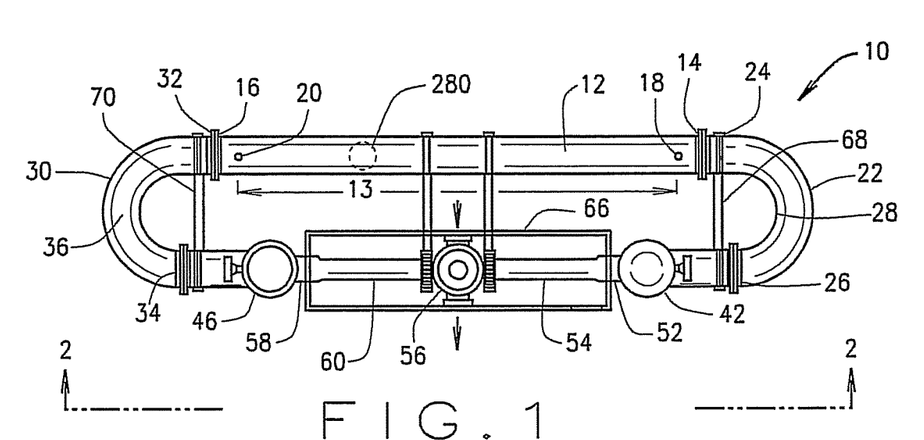
FIG. 1 is top view of the bidirectional sphere prover with vertical launch tubes.
Figure 2:
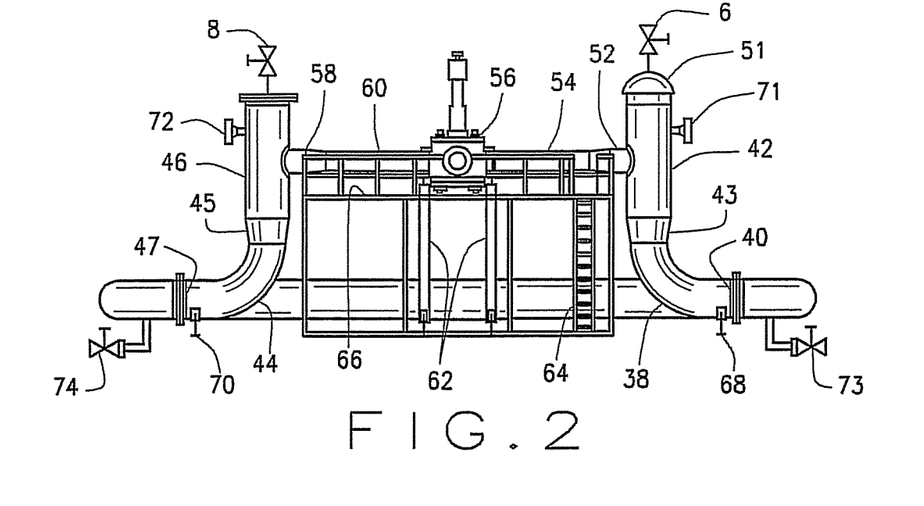
FIG. 2 is a side view of the bidirectional sphere prover with vertical launch tubes along the line 2-2 of FIG. 1.

Referring now to FIGS. 1 and 2, the bidirectional sphere meter proving system of the present invention is generally identified by the numeral 10. A straight piece of pipe 12 has a first flange 14 and an opposing second flange 16 on the ends. The flanges 14 and 16 are not altered by machining nor are any of the other flanges in the present invention. Prior art provers require machined flanges in the calibrated sections of piping; the present invention does not use flanges in the calibrated section of piping and does not require machined flanges anywhere else in the prover. Those skilled in the art know that machined flanges are much more expensive than standard flanges. A first detection switch 18 and a second detection switch 20 are positioned in the pipe 12 to indicate when the sphere 280, shown in phantom, passes through the straight calibrated section 13 of conduit 12. The straight calibrated section 13 is free of welds, flanges and elbows. The internal circumference of the conduit 12 is coated with a corrosion inhibitor such as epoxy or some other suitable substance. This coating also gives the prover sphere 280 a smooth surface to seal against and move across. A phenolic corrosion inhibitor called Plasticap A is available from Techni-Kote, Inc. of Houston, Tex. and is suitable for this purpose. The inhibitor is applied to a thickness of about 5 to about 8 mils and is rated for temperatures of up to about 325° F. (163° C.).

A first U-tube has a first flange 24, a second flange 26 and a weld 28 in the middle. The first flange 24 mates with the first flange 14 of the conduit 12. A second U-tube 30 has a first flange 32, a second flange 34 and a weld 36 in the middle. The first flange 32 of the second U-tube mates with the second flange 16 of the conduit 12. Those skilled in the art know that in standard pipe construction, there is a clearance or gap of about ⅛ inch between the id of the bolts and the id of the bolt hole in a standard flange. This is acceptable for ordinary piping situations, but for provers, it can damage the sphere. To avoid this problem and the expense of machined flanges, Applicant's recommend that the standard flanges in the present invention first be aligned with four or more low tolerance bolts that only have a clearance or gap of about 0.003 to about 0.004 inches between the od of the bolt and the id of the bolt hole, instead of the conventional clearance of about ⅛ inch. These low tolerance bolts are sometimes referred to as "shoulder bolts" in the industry. After the flanges have been correctly aligned with four or more low tolerance bolts, the other bolts may have a standard clearance or gap. However, the present invention does not have a flange in the straight calibrated section 13 of pipe 12, between the two detector switches 18 and 20.

A first elbow 38 is welded to a flange 40 on one end and on the opposite end to the first vertical launch tube 42. A second elbow 44 is welded to a flange 47 on one end and on the opposite end to the second vertical launch tube 46. A grate 48, not shown, is formed in the port 52 on the first launch tube to keep the sphere in the launch tube. A grate 50, not shown, is formed in the port 58 on the second vertical launch tube 46 to keep the sphere in the second launch tube. When there is no fluid flow through the prover, the sphere 280 will sink to the bottom 43 of the first launch tube or the bottom 45 of the second launch tube. On the top of the first launch tube 42 is a quick open closure 51. The quick open closure is an off the shelf item which can be purchased from any number of suppliers including: Modco Industries of Conroe, Tex., see www.modcoindustries.com and, T D Williamson of Tulsa, Okla., See, www.tdwilliamson.com. The quick open closure can have several mechanical means of operation, such as threads, clamps, etc. The purpose is to allow easy access to the first launch tube for maintenance of the prover, for example to replace the sphere 280. The sphere is heavier than the liquid being measured so when there is no fluid flow through the prover 10 the sphere will settle to the bottom of a launch tube. The port 52 connects to conduit 54 which connects to a bidirectional port 290 on the 4-way valve 56, better seen in FIG. 8. The ports 52 and 58 are larger than the piping 54 and 60 coming from the 4-way valve 56. These ports are made larger to reduce the pressure drop caused by the grate 48, not shown. The 4-way valve is an off the shelf item that can be purchased from several vendors including Cameron, headquartered in Houston, Tex., (www.c-a-m.com) and SPX Corporation a global multi-industry manufacturing company (www.spx.com). The SPX Flow Control division is located in Houston, Tex. The port 58 connects to the conduit 60 which connects to the second bidirectional port 294 on the 4-way valve 56, better seen in FIG. 8.

A ladder 64, when required, allows an operator to climb from the ground to the catwalk 66 and inspect/operate the 4-way valve. Supports 68 engage the first U-tube 22 and supports 70 engage the second U-tube 30 and are typical of additional supports for the system. A first water draw connection port 71 is positioned in first launch tube 42. A second water draw connection port 72 is positioned in second launch tube 46. A first drain 73 is positioned in the U-tube 22. A second drain 74 is formed in the U-tube 30. A first vent valve 6 is positioned in the top of quick open closure 51 and a second vent valve 8 is positioned in the top of second launch tube 46. These vent valves are used to vent all the air from the prover. A differential switch, not shown, is placed across the 4-way valve to verify sealing.

Figure 3:
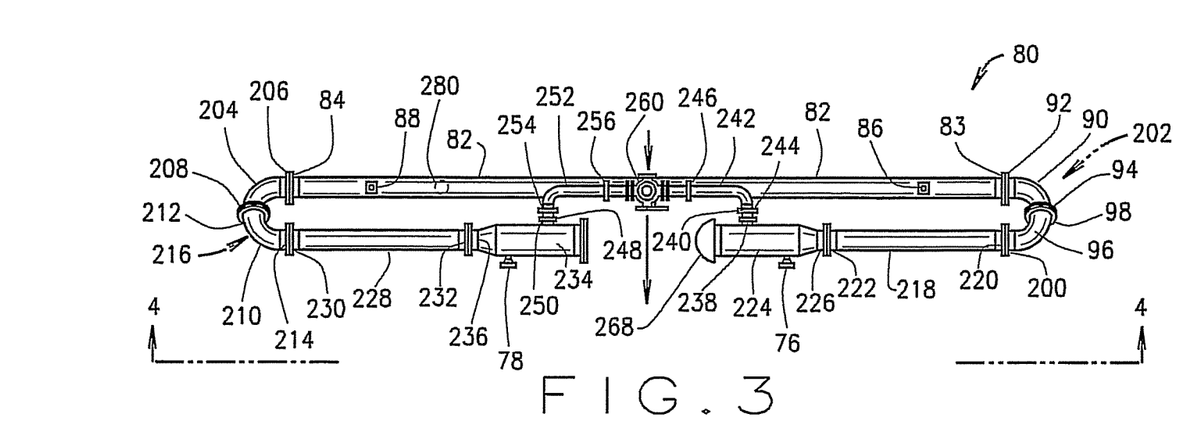
FIG. 3 is a top view of the bidirectional sphere prover with horizontal launch tubes.
Figure 4:
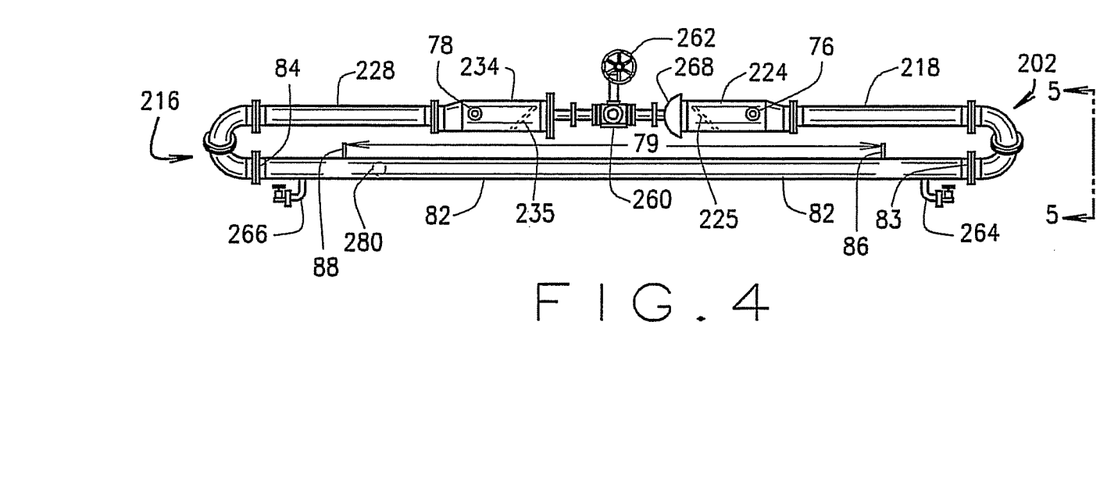
FIG. 4 is a side view of the bidirectional sphere prover with horizontal launch tubes along the line 4-4 of FIG. 3.
Figure 5:
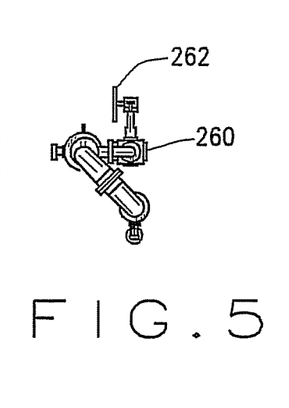
FIG. 5 is a end view of the bidirectional sphere prover with horizontal launch tubes along the line 5-5 of FIG. 4.

Referring now to FIGS. 3, 4 and 5, a bidirectional sphere meter proving system with horizontal launchers is generally identified by the numeral 80. A conduit 82 includes a straight calibrated section 79. The conduit 82 has a first flange 83 on one end and a second flange 84 on the opposite end. The flanges 83 and 84 are not machined, unlike the prior art, nor are any of the other flanges in the present invention. A first detection switch 86 and a second detection switch 88 are positioned in the straight calibrated section 79 of conduit 82. The detection switches indicate when the sphere 280, shown in phantom, passes through the straight calibrated section 79 of conduit 82. A first elbow 90 has a first flange 92 on one end and a second flange 94 on the other end. A second elbow 96 has a first flange 98 on one end and a second flange 200 on the opposite end. Flange 94 and 98 are bolted together to form a U-tube 202. The U-tube 202 can be fabricated from two flanged elbows as shown in these figures and/or it can be fabricated from two elbows of pipe as in the preceding figures which are welded together.

The flange 92 connects to the flange 83 on the straight calibrated section 82. A first elbow 204 has a first flange 206 on one end and a second flange 208 on the opposite end. A second elbow 210 has a first flange 212 on one end and a second flange 214 on the opposite end. The first elbow 204 and the second elbow 210 form a second U-tube 216. The second U-tube 216 can be fabricated from two flanged elbows as shown in these figures and/or it can be fabricated from two elbows of pipe as in the preceding figures which are welded together. The flange 206 connects to the flange 84 on the straight calibrated section of conduit 82. The first and second U-tubes and elbows of the present invention are not required to be of superior quality and the flanges are not machined which reduces manufacturing costs and maintains the integrity of the flange.

A conduit 218 has a flange 220 on one end and another flange 222 on the opposite end. The conduit 218 connects the U-tube 202 with the first horizontal launch tube 224. A quick open closure 268 is mounted on one end of the first horizontal launch tube 224. The quick open closure allows access to the interior of the first horizontal launch tube for maintenance, for example, if the sphere needs to be replaced. The first horizontal launch tube has a flange 226 on one end and a port 238 extending from the midsection. The port 238 includes a flange 240. A grate, not shown in the port 238, keeps the sphere from being pulled into the conduit 242 leading to the 4-way valve 260. The conduit 242 has a flange 244 on one end and a second flange 246 on the other end. A first water draw connection port 76 is formed in the first horizontal launch tube 224.

A conduit 228 has a flange 230 on one end and a second flange 232 on the opposite end. The conduit 228 connects the second U-tube 216 to the second horizontal launch tube 234. The second horizontal launch tube 234 includes a flange 236 and a port 248 extending from the midsection. The port 248 includes a flange 250. A grate, not shown in the port 248, keeps the sphere from being pulled pull out of the second horizontal launch tube into the conduit 252 leading to the 4-way valve 260. The conduit 252 has a first flange 254 on one end and a second flange 256 on the opposite end. The id of the port 238 is greater than the id of the conduit 242. A second water draw connection 78 is formed in the second horizontal launch tube 234. A first drain 264 is formed in conduit 82 and a second drain 266 is formed in conduit 82 to facilitate draining of the prover 80 for maintenance.

A ramp 225, shown in phantom, is formed in the first horizontal launch tube and a ramp 235, shown in phantom, is formed in the second horizontal launch tube as better seen in FIG. 4. The ramps are shown for illustrative purposes in the drawing. In actuality, the ramps 225 and 235 are not high enough to block access to the sphere in the first launch tube 224 after the quick open closure 268 has been opened. The sphere can be removed and inserted over the ramp 225 in the first launch tube 224. As previously mentioned, the sphere is heavier than the fluid being measured, so the sphere rolls down the ramps by the force of gravity when there is no fluid flow through the prover. The purpose of the ramps is to properly position the sphere for the next run so the sphere will start to move through the prover and not be trapped in either launch tube when the fluid flow is reversed. A circular handle 262, or electric motor operator, not shown, operates the 4-way valve.

Figure 6:
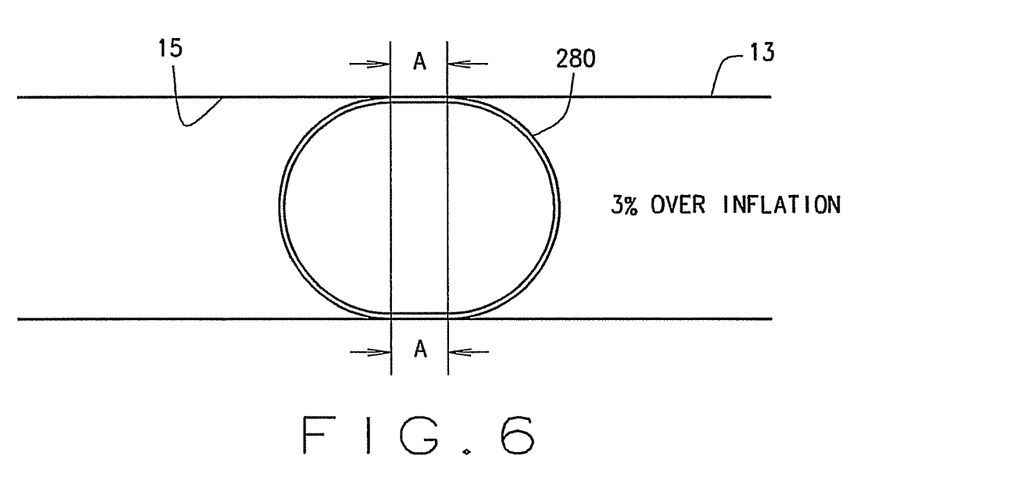
FIG. 6 is a section view of the sphere in the straight calibrated section of the bidirectional sphere prover with an over-finflation of 3%.

FIG. 6 is a section view of the sphere 280 in the straight calibrated section 13 of the conduit 12 with an overinflation of 3%. In this figure, the nominal size of the conduit is 36 inches and the sphere is over inflated to 3% of the cross sectional area of the interior of the conduit. The area of contact of the sphere with the interior diameter 15 of the pipe wall is shown diagrammatically by the distance "A" which is about 10.1725 inches. Because of the overinflation, the ball is compressed and a portion, diagrammatically shown by the distance "A" is elongated and contacts the interior diameter 15 of the pipe for an elongated distance. As is well known to those skilled in the art, the sphere is often filled with a 50/50 solution of glycol and water. In a nominal 36 inch diameter prior art prover the sphere is often over inflated to approximately 6% of the crossectional area of the prover id as shown in the next figure. Using the present invention, it is only necessary to over inflate the sphere 3% of the crossectional area of the id of the pipe which results in a system pressure drop of about 2 to about 3 psi.

Figure 7:
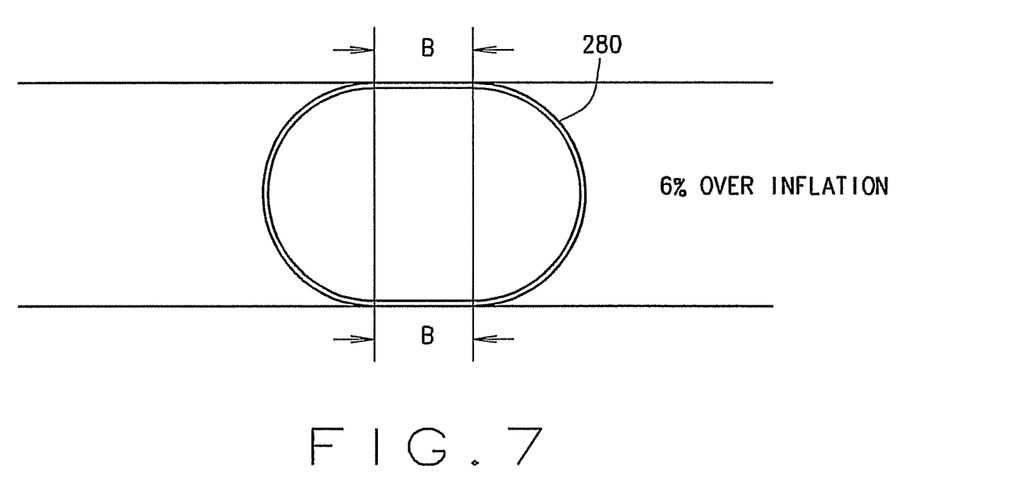
FIG. 7 is a section view of the sphere in the straight calibrated section of the bidirectional sphere prover with an over-inflation of 6%.

FIG. 7 is a section view of the sphere 280 in the calibrated section of a prior art prover with an overinflation of 6%. In this figure the length of contact area of the sphere in a 36 inch pipe is represented by the arrows "B" which is about 12.75 inches. This results in a system pressure drop of about 5 to about 6 psi. The higher the pressure drop, the more expensive it is to operate the prover. In prior art provers with over inflated spheres of 6% and higher pressure drops, the electric motors require more electricity to power the pumps needed to move the sphere between the two detector switches. Therefore lower pressure drop is a good thing. The present invention has a reduced pressure of about 25% when compared with a prior art system using a 36 inch nominal conduit and a 6% overpressure. The increased inflation is to accommodate for the imperfections found in the id of standard pipe elbows, welds and flange alignments all found in prior art. The current invention has eliminated the negative impact of those inherent, costly and nearly unavoidable imperfections.

Prior art provers of about 12 inches or more over inflate the sphere to about 4% over size. The present invention has a reduced pressure drop of about 8% when compared with a prior art system of 12 inches and an over size sphere of 4%. Prior art provers of about 30 inches or more typically use an over size prover sphere of 6% or more. As previously mentioned, the present invention has a reduced pressure drop of about 25% when compared with such prior art systems.

The present invention may be fabricated in any common pipe size including 6 inch, 8 inch, 10 inch, 12 inch, 16 inch, 20 inch, 24 inch, 30 inch, 36 inch and 40 inch. The size of the pipe, 12 and 82, the length of the straight calibrated section, 13 and/or 79, and the distance between the two detector switches will vary. The minimum volume of the straight calibrated section of pipe is determined by paragraphs 4.3.3, et al of the API Standard, Chapter 4, Section 2, which is incorporated herein by reference. The maximum and minimum sphere velocities are explained in paragraphs 4.3.4, et al of the API Standard, Chapter 4, Section 2, which is incorporated herein by reference. The prover diameter depends on the minimum and maximum flow rates and the minimum and maximum displacer velocities as explained in paragraph 4.3.5, et al of the API Standard, Chapter 4, Section 2, which is incorporated herein by reference. The distance between the detector switches on a prover is determined by the number of pulses the custody transfer meter produces per barrel of fluid. The API Standard recommends a minimum of 10,000 pulses be generated by the meter as the ball travels from one detector switch to the other.

As an example, if the custody transfer meter produces 1,000 pulses per barrel, and the number of pulses between the switches needs to be 10,000, then 10,000/1,000 equals 10 barrels or 420 gallons of volume of flow is needed between the switches. The API Standard, Chapter 4, Section 2 allows a prover sphere to achieve a velocity of between 0.5 and 5 feet per second while moving through the prover. The velocity of the sphere can be determined by the formula: distance in feet divided by time in seconds. The distance or length the liquid occupies is determined by the volume inside the pipe. The volume is determined by the inside area of the pipe in square feet times the length of the pipe in feet. This will give the cubic feet which can be converted to barrels or gallons. There are 6.742 cubic feet in a barrel of petroleum. Larger volumes of flow will require larger diameters of pipe to keep the velocity under 5 feet per second.

The 420 gallons of flow between the detectors may be obtained by using a shorter, large diameter straight calibrated section or a longer, smaller diameter calibrated section. The price of the pipe, flanges and fittings and maintaining a sphere velocity of between 0.5 to 5 ft/second define the size and length of pipe used in the present invention. The present invention does not normally require pulse interpolation because the velocity of the sphere in the straight calibrated section is sufficient to provide the 10,000 meter pulses required by the API Standard. The velocity of the sphere is more or less constant through the straight calibrated section of the prover and there are no elbows. This means that the meter pulses are more evenly spaced which makes the present invention more accurate than prior art designs. The absolute velocity of the sphere through the prover is not critical. However, maintaining a substantially constant sphere velocity through the straight calibrated sections, 13 and 79 is important to prover accuracy.

In a typical crude pipeline or oil offloading terminal, centrifugal or piston pumps are used to move the oil through the custody transfer meter and the prover. When the centrifugal pumps see a pressure increase in the system, the pump drops the flow rate coming from the pump, as is well known to those skilled in the art. Therefore, in prior art provers when the sphere encountered a weld, elbow or flange, the volume of fluid coming from the centrifugal pump would diminish and the pressure drop would increase which would result in uneven pulse from the custody transfer meter. The present invention produces substantially evenly spaced pulses because there are no impediments in the straight calibrated section between the two detector switches and therefore no substantial change in fluid flow rate. To make the most accurate measurement possible, the following variables should be held constant or near constant: fluid temperature, fluid composition, fluid pressure and fluid flow rate. The present invention does a better job of keeping the fluid pressure and the fluid flow rate constant during a prover run than prior art designs which makes the present invention more accurate.

According to the API Standard, Chapter 4, Section 2, paragraph 1.3, a "prover pass" is one movement of the sphere between the detectors in a prover. A "prover round trip" refers to the forward and reverse pass in a bidirectional prover, like the present invention. A "prover run" is typically 5 prover round trips in a bidirectional prover working with liquid petroleum such as crude oil, or gasoline.

After the present invention has been built, it is necessary to calibrate the apparatus before it is sent to the field. Calibration is done using a water draw, which is well known to those skilled in the art. All the air in the piping and launch tubes of the prover is displaced by water. To calibrate the present invention, three round trips with water are required and each measurement result must be within 0.02% of the other. If the prover does not meet these levels of accuracy, it may not be sent to the field. This water drawn is done by third parties and may take a couple of hours on a small prover to a full day on a larger prover, assuming everything goes well. Once the bidirectional sphere prover has been calibrated at the plant it is sent to the field to be used in conjunction with a Petroleum Metering Systems or L.A.C.T. units. In the field, the API Standard requires that five round trips be made for each run and that each round trip have a measurement result that is within 0.05% of the others. It is common to make five or more runs during the offloading of a tanker assuming the custody transfer meter and the prover all agree. Pipeline meters are proved on a regular basis depending on company standards. Pipeline meters are always proved when there is a significant change in product being metered, the pressure, the temperature or especially the flow rate. If there is disagreement, more prover runs will be made. The improved accuracy of the present invention due to the lack of elbows, welds and flange mating imperfections in the straight calibrated section will typically reduce the need for additional runs in excess of 5 which are required by the API Standard.

Figure 8:
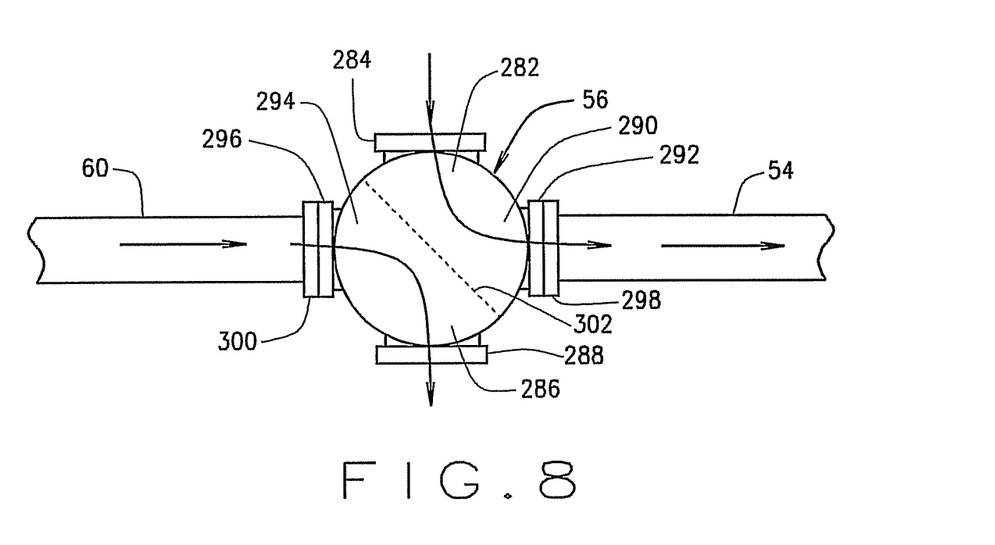
FIG. 8 is a diagrammatic view of a 4-way valve arranged to flow crude oil counter clockwise through the prover of FIG. 1.
Figure 9:
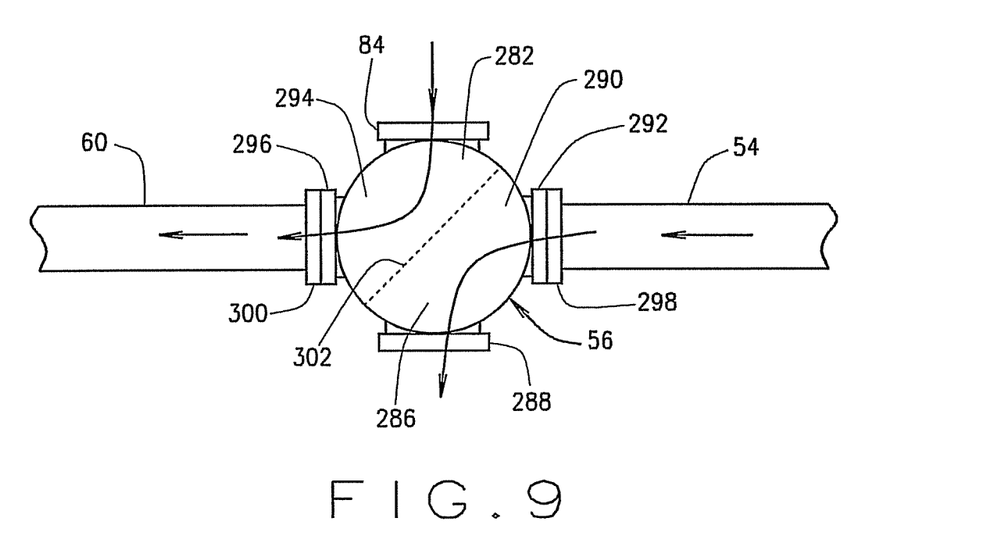
FIG. 9 is a diagrammatic view of the 4-way valve arranged to flow crude oil clockwise through the prover of FIG. 1.

Referring now to FIGS. 8 and 9. FIG. 8 is a diagrammatic view of the 4-way valve 56 arranged to flow crude oil counter clockwise through the prover of FIG. 1. FIG. 9 is a diagrammatic view of the 4-way valve 56 arranged to flow fluid clockwise through the prover of FIG. 1. An inlet port 282 in the 4-way valve is surrounded by an inlet flange 284. An outlet port 286 in the 4-way valve is surrounded by an outlet flange 288. A first bidirectional port 290 is surrounded by first bidirectional flange 292. A second bidirectional port 294 is surrounded by a second bidirectional flange 296. A flange 298 is formed on the conduit 54 and is connected to first bidirectional flange 292. A flange 300 is formed on conduit 60 and connects to second bidirectional flange 296. The numeral 302 indicates the valve element 302 which is illustrated by the dashed line through the center of the 4-way valve 56.

In FIG. 8 fluid flows into the inlet port 282 of the 4-way valve and is diverted by the valve element 302 into the conduit 54 as indicated by the flow arrows. This causes the fluid to flow counter clockwise through the prover of FIG. 1. The fluid returns to the conduit 60 and enters the second bidirectional port 294 of the 4-way valve and is diverted by the valve element to the outlet port 286 as indicated by the flow arrows.

In order to reverse the flow of the fluid through the bidirectional fluid, the valve element 302 is turned to the opposite direction. Fluid then enters the inlet port 282 of the 4-way valve and is diverted by the valve element to the conduit 60 as indicated by the flow arrows. This causes the fluid to flow in the opposite direction through the prover of FIG. 1 causing the sphere to move in the opposite direction past the two detention switches of the prover. The fluid then returns via the conduit 54 and is diverted by the valve element to the outlet port 286 as indicated by the flow arrow. The valve element 302 may be manually turned or automatically controlled by an actuator, not shown.

According to API Standard, Chapter 4, Section 2, paragraph 4.2.4., the output from the primary flow element of positive displacement and turbine meters, or other types of meters, can exhibit variations even when flow rate through the meter is constant. These variations are caused by imperfections and/or wear in bearings, blades, sensory plugs and other moving parts. Gears, universal joints, clutches and other mechanical devices that compensate, calibrate and transmit the output of the primary flow element can cause variations in the indicated flow rate signal that are greater than those caused by the primary flow element.

Three types of pulse train variations can be caused by the custody transfer meter as follows: interpulse deviation, which refers to random variation between consecutive pulses, pulse rate modulation, which refers to a pattern of variation in pulse rate or K factor; and pulse burst variations which refers to meters that do not have a frequency output proportional to flow and where the pulses are transmitted intermittently. These variations occur even when the flow rate through the meter is constant. They also affect the meter pulse count during a proving run and the error in the meter pulse count. The present invention does not eliminate interpulse deviation, pulse rate modulation and pulse burst variation caused by the custody transfer meter.

The present invention reduces or eliminates other types of pulse train variations which can also be caused by the prover. The sphere does not undergo any substantial changes in velocity while passing through the straight calibrated section of the present invention which makes it more accurate than prior art designs with elbows, welds and flanges in the calibrated section. For example, when a sphere goes through the elbow of a prior art prover it tends to slow down slightly which causes variation in the pulse train. The speed of the sphere in prior art designs is adversely affected because the elbows have a different radius on the inside than on the outside of a bend and elbows are not perfectly round. This causes the ball to slow down while passing through the elbow. As the sphere slows down, the fluid flow rate diminishes and so does the frequency of the pulse output. When the ball leaves the elbow, it speeds up and so does the fluid flow rate. The pulses are therefore closer together.

Some forms of pulse interpolation use the average time between pulses to determine the volume between the last pulse and when the sphere hits the sphere detector. If this average is not correct then the volume of the last partial pulse will not be correct. For example, when the sphere goes past a set of flanges in a prior art prover, it may speed up slightly if the flanges are larger than the id of the pipe or it may slow down slightly if the flanges are slightly smaller than the id of the pipe which causes variation in the pulse train. When the sphere encounters the increased friction caused by a smaller diameter in the pipe it slows down causing the flow rate to slow down at this point. The slower flow causes a slower pulse output and a faster flow causes a faster pulse output. The pulse output is directly proportional to the flow. The more constant the fluid flow rate through the prover, the more constant is the pulse output rate. For example, when the sphere goes past a weld in a prior art prover, it may speed up slightly if the weld is ground into the pipe or it might slow down slightly if the weld is not ground enough, causing a slight protrusion into the pipe, which may cause variation in the pulse train. The current invention encourages a consistent speed and therefore a consistent pulse train, which is a very positive attribute for a prover design.

Operation of the Bidirectional Meter Proving System

This is a description of a prover pass where the sphere 280 moves from the first launch tube 42 to the second launch tube 46 in a counter clockwise direction through the prover 10 of FIGS. 1, 2, 8 and 9. First, a valve on the L.A.C.T. unit or Petroleum Metering System, not shown in these drawings, is opened allowing fluid to flow from the custody transfer meter, not shown, into the inlet port 282 of the 4-way valve 56, as shown by the flow arrows in FIG. 8. At the beginning of this prover pass, the sphere is at the bottom 45 of the second sphere launcher 46. To begin the prover pass, the 4-way valve 56 is actuated reversing the flow through the prover as best seen in FIG. 9.

As the sphere 280 begins the prover pass, the fluid flow through the prover is clockwise when looking at FIG. 1. The fluid enters the second sphere launcher via conduit 60. The fluid flow causes the sphere to pass through the elbow 44, the U-tube 30 and past the second detector switch 20, through the straight calibrated section 13 of the pipe 12, past the first detector switch 18, the U-tube 22, the elbow 38 and into the first launcher 42. While the sphere passes between the two detector switches, the custody transfer meter sends approximately 10,000 pulses proportional to the flow that are as evenly spaced as the custody transfer meter is capable of generating to the custody flow computer, not shown. There may be one or multiple custody flow computers connected in a network to a server. The flow computer(s) may be located on a prover skid, a meter skid, a control room or in some combination thereof.

In order to make the reverse pass, the 4-way valve is actuated as shown in FIG. 8 causing the fluid flow to pass counter clockwise through the prover 10 of FIG. 1. At the beginning of the pass, the sphere is at the bottom 43 of the first launch tube 42. The fluid enters the first sphere launcher via conduit 54. This fluid flow causes the sphere to pass through the elbow 38, the U-tube 22, past the first detector switch 18, through the straight calibrated section 13 of pipe 12, past the second detector switch 20, through the U-tube 30, the elbow 44 and into the second launch tube 46. While the sphere passes between the two detector switches, the custody transfer meter sends approximately 10,000 pulses that are as evenly spaced as the custody transfer meter is capable of generating to the custody flow computer, not shown. These two passes complete what is called a round trip. Five round trips that are within 0.05% of each other complete a prover run.

The invention claimed is:

1. A bidirectional sphere prover for use with a custody transfer meter for liquids, the prover comprising:
    a) a straight calibrated section of pipe having a first detector switch proximate a first end and a second detector switch proximate a second end and said straight calibrated section of pipe having a first flange at the first end and a second flange at the second end;
    b) the straight calibrated section of pipe being free of flanges, lateral openings and elbows between the first detector switch and the second detector switch;
    c) the straight calibrated section of pipe defining a tubular interior surface coated with a corrosion inhibitor;
    d) the first end of the straight calibrated section of pipe being connected to a first U-tube conduit being connected to a first elbow being connected to a first launch tube;
    e) the second end of the straight calibrated section of pipe connected to a second U-tube conduit being connected to a second elbow being connected to a second launch tube;
    f) a resilient single sphere moving back and forth from the first launch tube, through the first elbow, the first U-tube conduit the straight calibrated section of pipe, second U-tube conduit, the second elbow to the second launch tube in response to actuation of a 4-way valve; and
    g) the resilient single sphere being in sealing contact with the coating of corrosion inhibitor on the tubular interior surface of the straight calibrated section of pipe.

2. The apparatus of claim 1 further including the first launch tube and the second launch tube being oriented generally parallel to the straight calibrated section of pipe.

3. The apparatus of claim 2 further including a port positioned on an outlet of the first sphere launch tube and a port positioned on an outlet of the second sphere launch tube to reduce pressure drop through the bidirectional sphere prover.

4. The apparatus of claim 3 wherein the resilient single sphere is overinflated about 3% of a cross-sectional area of the tubular interior surface of the straight calibrated section of pipe.

5. A bidirectional sphere prover having a 4-way valve for reversing the flow of crude oil through the prover, the prover comprising:
   a) a straight calibrated section of pipe having a first detector switch proximate a first end and a second detector switch proximate a second end and said straight calibrated section of pipe having a first flange at the first end and a second flange at the second end;
   b) the straight calibrated section of pipe being free of flanges, lateral openings and elbows between the first detector switch and the second detector switch;
   c) the straight calibrated section of pipe defining a tubular interior surface coated with a corrosion inhibitor;
   d) the first end of the straight calibrated section of pipe being connected to a first U-tube being connected to a first conduit being connected to a first launch tube;
   e) the second end of the straight calibrated section of pipe connected to a second U-tube connected to a second conduit being connected to a second launch tube;
   f) a resilient single sphere moving back and forth from the first launch tube, through the first conduit, the first U-tube the straight calibrated section of pipe, second U-tube, the second conduit to the second launch tube in response to actuation of the 4-way valve; and
   g) the resilient single sphere being in sealing contact with the coating of corrosion inhibitor on the tubular interior surface of the straight calibrated section of pipe.

6. The apparatus of claim 5 wherein the first and second launch tubes are oriented perpendicular to the straight section of calibrated pipe, each launch tube alternately capturing the resilient single sphere after each pass between the two detector switches in the prover.

7. The apparatus of claim 5 wherein the first and second sphere launch tubes are oriented generally parallel to the straight section of calibrated pipe and each sphere launch tube alternately captures the resilient single sphere after each pass between the two detector switches in the prover.

8. The apparatus of claim 7 further including a port positioned on an outlet of the first sphere launch tube and a port positioned on an outlet of the second sphere launch tube to reduce pressure drop through the bidirectional sphere prover.

9. The apparatus of claim 8 wherein the resilient single sphere is overinflated about 3% of a cross sectional area of the tubular interior surface of the straight calibrated section of pipe.

* * * * *

UNITED STATES PATENT AND TRADEMARK OFFICE
CERTIFICATE OF CORRECTION

PATENT NO. : 8,505,355 B2
APPLICATION NO. : 12/128932
DATED : August 13, 2013
INVENTOR(S) : Daniel J. Rudroff Page 1 of 1

It is certified that error appears in the above-identified patent and that said Letters Patent is hereby corrected as shown below:

In the Specification

In Col. 1, line 13, delete "flinds" and replace with -- fluids --

In Col. 1, line 46, delete "Modem" and replace with -- Modern --

In Col. 5, line 10, delete "overfinflation" and replace with -- overinflation --

Signed and Sealed this
First Day of October, 2013

Teresa Stanek Rea
*Deputy Director of the United States Patent and Trademark Office*